S. H. ENGLISH.
FRYING PAN COVER.
APPLICATION FILED AUG. 9, 1918.
1,295,716.
Patented Feb. 25, 1919.
2 SHEETS—SHEET 1.
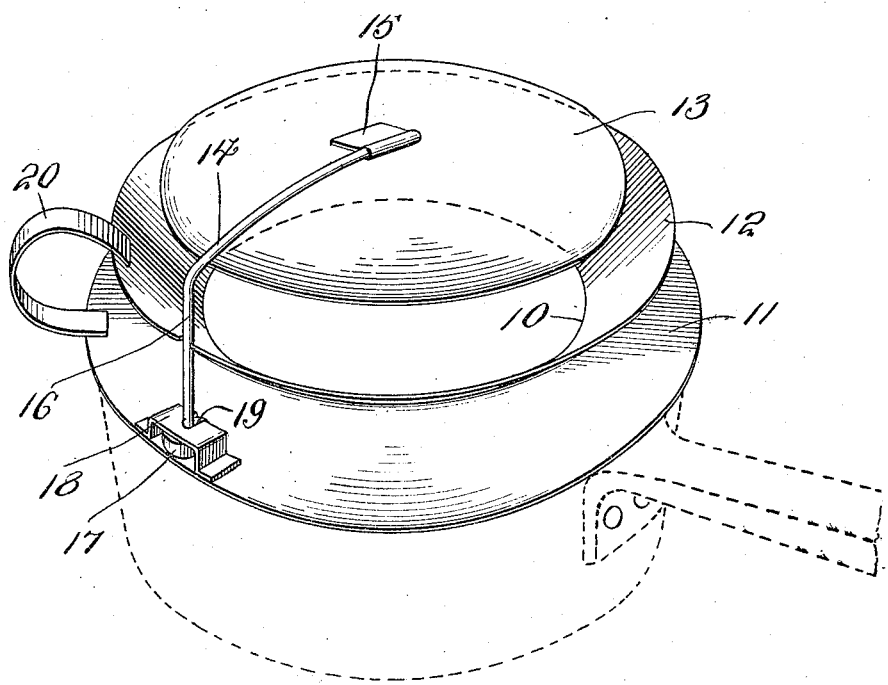
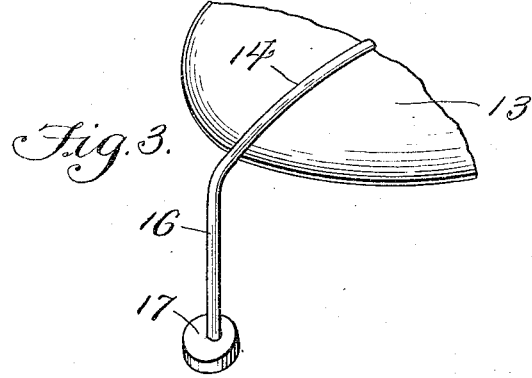
Witnesses
J. T. L. Wright
Inventor
S. H. English
By Victor J. Evans
Attorney

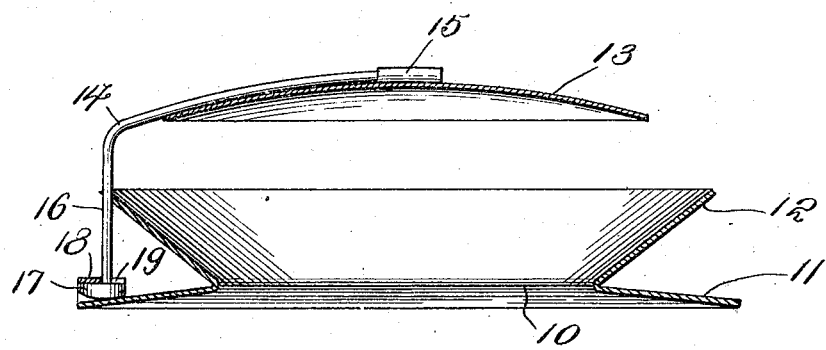
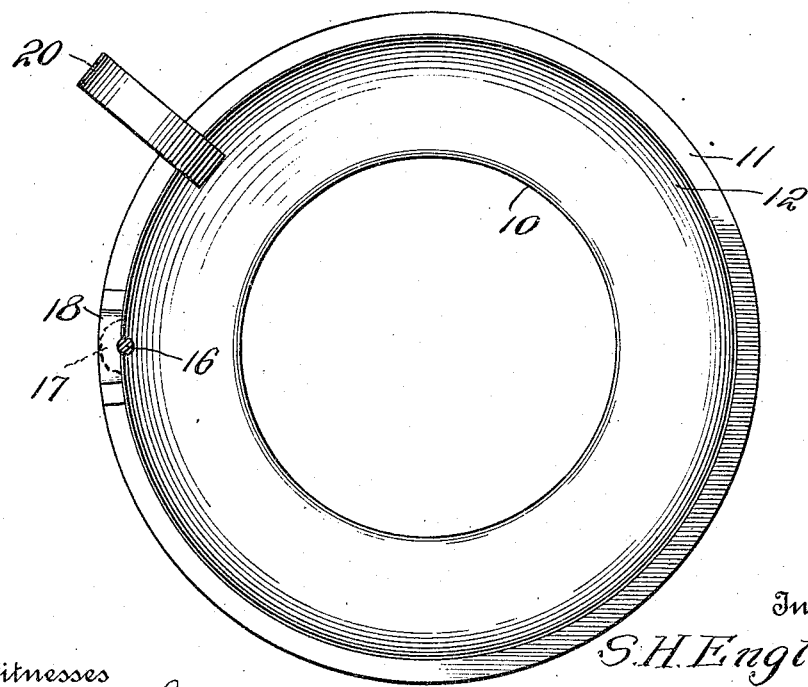

UNITED STATES PATENT OFFICE.

SYLVESTER H. ENGLISH, OF BURK, IDAHO.

FRYING-PAN COVER.

1,295,716.

Specification of Letters Patent.　Patented Feb. 25, 1919.

Application filed August 9, 1918. Serial No. 249,113.

*To all whom it may concern:*

Be it known that I, SYLVESTER H. ENGLISH, a citizen of the United States, residing at Burk, in the county of Shoshone and State of Idaho, have invented new and useful Improvements in Frying-Pan Covers, of which the following is a specification.

This invention relates to cooking utensils, the primary object of the invention being to provide an attachment for use in connection with a frying pan or skillet for preventing the grease from splashing upon the stove, the burning grease causing quantities of smoke and disagreeable odors. It also acts to prevent waste of grease and fats, the grease flying from the pan striking an obstruction and being directed back into the pan, the obstruction being so arranged as to permit of its being swung aside to turn or otherwise attend the food being cooked.

For the above purpose the invention includes an annulus adapted to be placed upon the pan, the said annulus having an outwardly and upwardly flared wall and carrying an engaging member adapted to removably hold one end of an arm which supports a concavo convex baffle plate or shield, the latter being held spaced above the annulus to permit the passage of air to the contents of the pan.

In the drawings:—

Figure 1 is a perspective view illustrating the use of the invention, a frying pan or skillet being shown by dotted lines;

Fig. 2 is a sectional view on the line 2—2 of Fig. 1; the frying pan or skillet being omitted; and Fig. 3 is a detail perspective view of the baffle plate detached.

Fig. 4 is a horizontal section taken just below the baffle plate.

Referring to the drawings in detail wherein like characters of reference denote corresponding parts, the numeral 10 indicates an annulus which includes a substantially flat ring 11 and an outwardly and upwardly flared wall 12, the flat ring 11 and the wall 12 being connected at their inner peripheries, so that the annulus is substantially V-shaped in cross section.

Supported above the annulus in spaced relation thereto, is a baffle plate 13. This plate is preferably concavo convex in section and is normally disposed concentrically of the annulus 10 with the concaved face opposed thereto. The said plate 13 is supported upon an arm 14, which is rigidly secured thereto as shown at 15, the arm extending diametrically across the top of the plate and downwardly at one side thereof to form a standard 16. The lower end of the standard 16 is provided with a head 17, which is adapted to fit within a bracket 18, provided with a notch 19, the said notch receiving the standard 16. This provides a removable engagement between the annulus and the baffle plate. The engagement being such as to permit of the said plate being swung to either side of the annulus upon the standard 16 as a pivot. By this means the said baffle plate may be swung out of the way for the purpose of attaining access to the contents of the frying pan or skillet. A handle 20 is secured to the annulus, providing convenient means for handling the device.

In the use of the invention the device is placed upon the top of a skillet or frying pan, the grease flying from the pan striking against the under side of the baffle plate 17 and dripping therefrom either directly back into the pan or upon the flared wall 12. In the latter event the inclination with the wall will direct the grease back into the skillet or pan.

The invention is susceptible of various changes in its form, proportions and minor details of construction and the right is reserved to make such changes.

Having described the invention, what is claimed is:—

1. The combination with a cooking vessel of an annulus adapted to be spaced upon said vessel, a baffle plate, an arm secured to the baffle plate and an engaging member carried by the annulus for detachable engagement with the arm for holding the baffle plate spaced above the annulus.

2. The combination with a cooking vessel, of an annulus adapted to be placed upon said vessel, an upwardly and outwardly flared wall included in the annulus, a baffle plate supported by and spaced above the annulus, a notched bracket carried by the annulus and an arm secured to the baffle plate for removable engagement with said notched bracket.

3. The combination with a cooking vessel, of an annulus adapted to be placed upon said vessel, a baffle plate supported by and spaced above the annulus and means for connecting the baffle plate to the annulus to permit of the former being swung to either side of the latter.

4. The combination with a cooking vessel, of an annulus adapted to be placed upon said vessel, a baffle plate supported by and spaced above the annulus and means for removably and pivotally securing the baffle plate to the annulus to permit of its being swung to either side of the latter.

In testimony whereof I affix my signature.

SYLVESTER H. ENGLISH.